US007714968B2

(12) United States Patent  
Iwamoto

(10) Patent No.: US 7,714,968 B2
(45) Date of Patent: May 11, 2010

(54) LIQUID CRYSTAL DISPLAY DEVICE WHOSE ELECTRODES HAVE SLITS ARRANGED IN A STAGGERED AND ALTERNATING FASHION

(75) Inventor: Yoshihisa Iwamoto, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 94 days.

(21) Appl. No.: 11/977,494

(22) Filed: Oct. 25, 2007

(65) Prior Publication Data

US 2008/0117374 A1 May 22, 2008

(30) Foreign Application Priority Data

Nov. 16, 2006 (JP) ............... 2006-310188

(51) Int. Cl.
*G02F 1/1337* (2006.01)
*G02F 1/1343* (2006.01)
(52) U.S. Cl. ............... 349/130; 349/129; 349/142; 349/143
(58) Field of Classification Search ......... 349/129–131, 349/143, 142
See application file for complete search history.

(56) References Cited

U.S. PATENT DOCUMENTS 6,710,833 B2 * 3/2004 Wang .................. 349/130
6,816,223 B2 11/2004 Sugiyama et al.
7,050,134 B2 * 5/2006 Song et al. .................. 349/129
2004/0165136 A1 8/2004 Sugiyama et al.

FOREIGN PATENT DOCUMENTS

JP 3108768 B2 9/2000
JP 2004-252298 A 9/2004

* cited by examiner

*Primary Examiner*—Andrew Schechter
*Assistant Examiner*—Michael Inadomi
(74) *Attorney, Agent, or Firm*—Frishauf, Holtz, Goodman & Chick, P.C.

(57) ABSTRACT

A liquid crystal display device whose transparent electrodes have slits of a rectangle shape or a parallelogram shape. The slits include slits of first and second kinds having different angles relative to a row direction. The slit of the first kind in one transparent electrode and the slit of the second kind in the other transparent electrode are alternately disposed along the column direction to form a first slit column, and the slit of the second kind in the one transparent electrode and the slit of the second kind in the other transparent electrode are alternately disposed along the column direction to form a second slit column. The first slit column and second slit column are alternately disposed along the row direction, and each position of slits of the first slit column is shifted by half a slit period from each position of slits of the second slit column.

7 Claims, 8 Drawing Sheets (7A)

(7B)

LIQUID CRYSTAL DISPLAY DEVICE WHOSE ELECTRODES HAVE SLITS ARRANGED IN A STAGGERED AND ALTERNATING FASHION

CROSS REFERENCE TO RELATED APPLICATION

This application is based on and claims priority of Japanese Patent Application No. 2006-310188 filed on Nov. 16, 2006, the entire contents of which are incorporated herein by reference.

BACKGROUND OF THE INVENTION

A) Field of the Invention

The present invention relates to a liquid crystal display device, and more particularly to a liquid crystal display device having devised electrode patterns.

B) Description of the Related Art

It is required to improve the visual angle characteristics and transmissivity of a liquid crystal display device.

For a vertical alignment liquid crystal display device of a segment type or a type combining segments and dot matrices, a so-called two-domain alignment control method has been disclosed or proposed by which slit openings are formed through electrodes of the display device to generate oblique electric fields near the slit openings formed through the upper and lower electrodes in a display area, and liquid crystal alignment is controlled by these electric fields to make central molecules in a liquid crystal layer have alignment orientations shifted by 180°. A twisted nematic (TN)-LCD has been disclosed in Japanese Patent No. 3108768, and a vertical alignment LCD has been proposed in JP-A-2004-252298. According to these publications, a longer side of each slit opening is disposed along a right/left direction of the liquid crystal display device. Therefore, two-domain alignment is obtained having different alignment orientations of liquid crystal molecules along an up/down direction of the device, so that visual angle characteristics having good up/down and right/left symmetries can be acquired.

With the method described in the above-described Patent Document, since refractive indices of longer and shorter optical axes of liquid crystal are different, it is difficult to equalize the visual angle characteristics along the up/down and right/left directions. It is also desired to maintain good transmissivity by making alignment uniform as much as possible.

SUMMARY OF THE INVENTION

An object of this invention is to provide a liquid crystal display device capable of presenting good visual angle characteristics and transmissivity.

According to one aspect of the present invention, there is provided a liquid crystal display device comprising: a pair of substrates disposed facing each other; a pair of transparent electrodes consisting of a transparent electrode formed on each of the two substrates on the surface facing the opposite substrate, the transparent electrodes being stacked so as to sandwich a vertical alignment liquid crystal layer to form a display area; and slits of a rectangle shape or a parallelogram shape formed through the transparent electrodes in a matrix shape, wherein: the slits include slits of first and second kinds having different angles relative to a row direction; slits of the first kind are disposed along the row direction at one row, and slits of the second kind are disposed along the row direction at each row adjacent to the one row along a column direction; the slit of the first kind in one transparent electrode and the slit of the first kind in the other transparent electrode are alternately disposed along the column direction to form a first slit column; the slit of the second kind in the one transparent electrode and the slit of the second kind in the other transparent electrode are alternately disposed along the column direction to form a second slit column; and the first slit column and the second slit column are alternately disposed along the row direction, and a slit period of the first slit column is shifted by half a slit period from a slit period of the second slit column.

It is therefore possible to realize good visual angle characteristics and high transmissivity.

It is possible to prevent a rise in electric resistance of electrodes.

It is possible to facilitate designs of various segment patterns and art works.

DESCRIPTION OF THE PREFERRED EMBODIMENTS

First Embodiment

Figure 1:
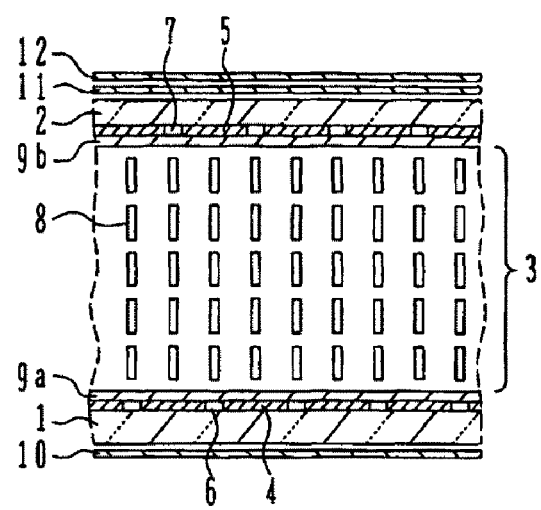
FIG. 1 is a schematic cross sectional view of a vertical alignment liquid crystal display device.

FIG. 1 is a schematic cross sectional view of a vertical alignment liquid crystal display device according to the first embodiment. The liquid crystal display device shown in FIG. 1 has a back substrate 1 made of glass and a front substrate 2 made of glass and facing the back substrate, and a liquid crystal layer 3 is disposed between both the substrates 1 and 2. Transparent back electrodes 4 as segment electrodes are disposed on the back substrate 1, and a transparent front electrode 5 as a common electrode is disposed on the front substrate 2, respectively on the side of the liquid crystal layer 3. Both the transparent electrodes 4 and 5 are superposed upon each other with the liquid crystal layer 3 being interposed therebetween, and the superposed area constitutes a display area. A plurality of slits (rectangle or parallelogram, parallelogram in FIG. 1) 6 and 7 to be described later are formed through both the transparent electrodes 4 and 5 in the display area. Alignment films 9a and 9b are disposed on both the substrates 1 and 2 on the liquid crystal layer 3 side, covering both the transparent electrodes. An insulating film may be disposed when necessary between the alignment film and transparent electrode.

Description will be made on a manufacture method for the liquid crystal display device. First, the transparent electrodes 4 and 5 mainly made of indium tin oxide (ITO) are formed on both the substrates 1 and 2.

The vertical alignment films 9a and 9b are coated and baked, covering the transparent electrodes 4 and 5. The alignment film material may be SE1211 manufactured by Nissan Chemical Industries, Ltd.

Next, main seal material is coated on the substrates 1 and 2, and gap control members having a predetermined diameter (in this embodiment, 4 μm) are sprayed. Thereafter, both the substrates 1 and 2 are stacked and the main seal material is cured to thereby form an empty cell between the substrates 1 and 2.

Liquid crystal is injected into the empty cell to form the liquid crystal layer 3. The liquid crystal material used has $\Delta\epsilon<0$ and $\Delta n$ of about 0.15. Liquid crystal molecules 8 in the liquid crystal layer 3 are vertically aligned by the vertical alignment films.

Thereafter, a back polarizer 10 is bonded to the outer side (lower side in FIG. 1) of the back substrate 1, and a visual angle compensation plate 11 and a front polarizer 12 in a stacked state are bonded to the outer side (upper side in FIG. 1) of the front substrate 2. The material of the visual angle compensation plate 11 may be a film VAC-180 manufactured by Sumitomo Chemical Company Ltd.

Figure 2:
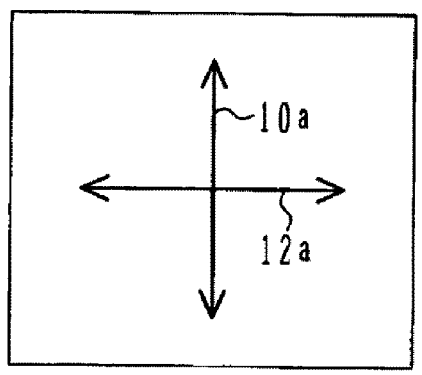
FIG. 2 is a plan view showing directions of transmission axes of polarizers of the liquid crystal display device.

FIG. 2 is a plan view showing directions of transmission axes of the polarizers of the liquid crystal display device. As shown, a transmission axis 10a of the back polarizer 10 is perpendicular to a transmission axis 12a of the front polarizer 12 to form a normally black liquid crystal display device. In this way, a liquid crystal is formed.

Figure 3:
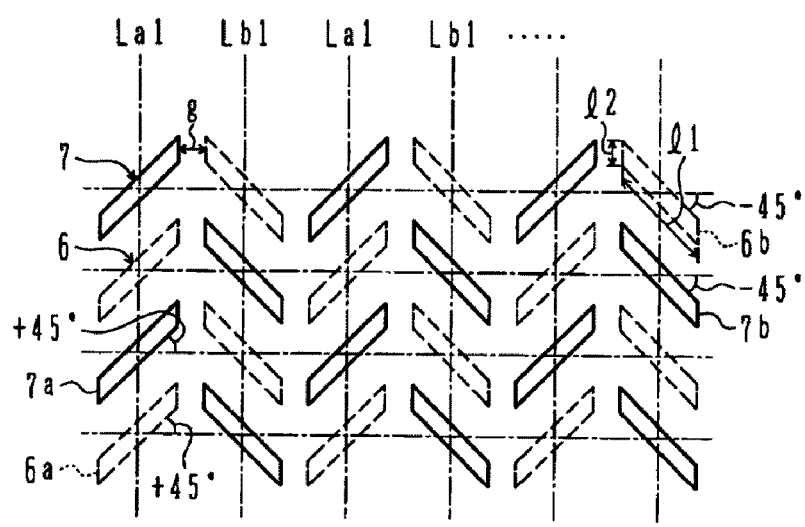
FIG. 3 is a plan view showing a layout of slits of the liquid crystal display device.

FIG. 3 is a plan view showing a slit layout of the liquid crystal display device. As shown, in the first embodiment, slits formed through the transparent electrodes are disposed in a matrix shape. Although directions of rows and columns are arbitrary in the display plane, it is preferable that the row direction is coincident with the right/left (or up/down) direction as the liquid crystal display device is viewed in a normal state, and that the column direction is coincident with the up/down (right/left) direction.

The slits 6 indicated by dotted lines and formed through the transparent back electrode 4 and the slits 7 indicated by solid lines and formed through the transparent front electrode 5 are constituted of slits 6a and 7a of the first kind having an angle relative to the row direction and slits 6b and 7b of the second kind having an angle different from that of the first kind relative to the row direction.

Description will be directed to the slit 6 (7). In one of the transparent electrodes 4 and 5, the slits 6a (7a) of the first kind are disposed along the row direction at each row, and the slits 6b (7b) of the second kind are disposed along the row direction at each row adjacent to the first-mentioned row at a position shifted by half a pitch (slit period) along the row direction.

The slit 6a of the first kind of the transparent back electrode 4 and the slit 7a of the first kind of the transparent front electrode 5 are alternately disposed along each column direction at positions shifted by half a pitch (slit period) along the column direction to form a first slit column La1. The slit 6b of the second kind of the transparent back electrode 4 and the slit 7b of the second kind of the transparent front electrode 5 are alternately disposed along each column direction at positions shifted by half a pitch along the column direction to form a second slit column Lb1.

The first slit column La1 and second slit column Lb1 are alternately disposed along the row direction, and each position of slits of the first slit column La1 is shifted by half a period from each position of slits of the second slit column Lb1.

In the first embodiment, the inclination angle of the slit of the first kind relative to the row direction is set to about +45°, whereas the inclination angle of the slit of the second kind relative to the row direction is set to about −45°. Although these inclination angles may be set to angles different from about ±45°, it is preferable to set the inclination angles to ±45° in order to maintain good symmetries of the visual angle characteristics along both the up/down and right/left directions.

Figure 4:
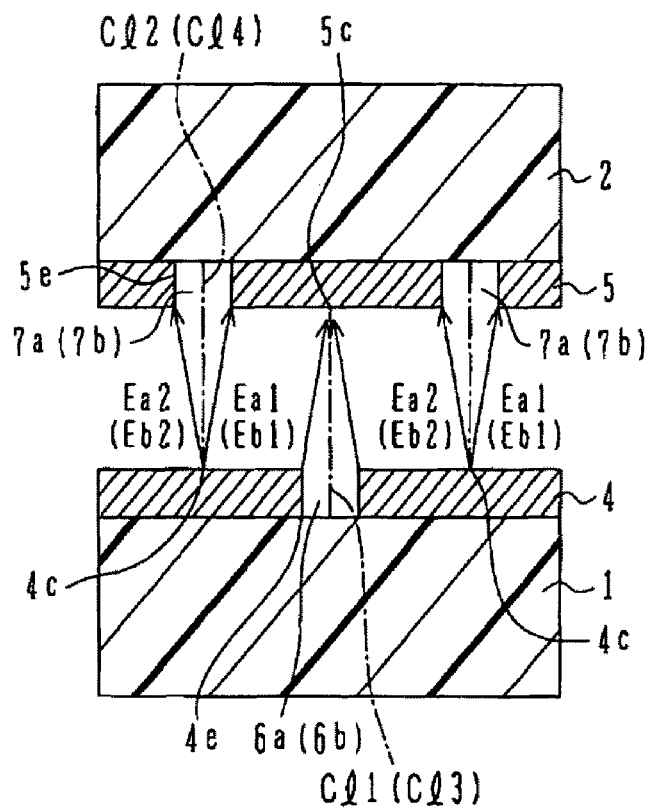
FIG. 4 is a schematic cross sectional view showing directions of electric fields generated between transparent electrodes.

FIG. 4 is a schematic cross sectional view showing directions of electric fields generated between the transparent electrodes. In the slit layout of the first embodiment, oblique electric fields Ea1 (Eb1) are generated extending from an edge 4e (border of slit) of the back electrode 4 toward a slit center line portion 5c of the front electrode 5. Electric fields parallel to these electric fields are also generated extending from a slit center line portion 4c of the back electrode 4 toward an edge 5e of the front electrode.

Oblique electric fields Ea2 (Eb2) are also generated having a different inclination angle from that of the oblique electric fields Ea1 (Eb1), setting the slit center line portion 4c as a border. Electric fields parallel to these electric fields are also generated extending from the edge 4e toward the slit center line portion 5c.

The slit center line portion indicates a position on the electrode in a display plane corresponding to each of center lines Cl1 to Cl4 of each slit along the width direction (perpendicular to the longitudinal direction).

Although the direction of the electric field is described as directing from the transparent back electrode 4 to transparent front electrode 5, the direction may be reversed.

Figure 5:
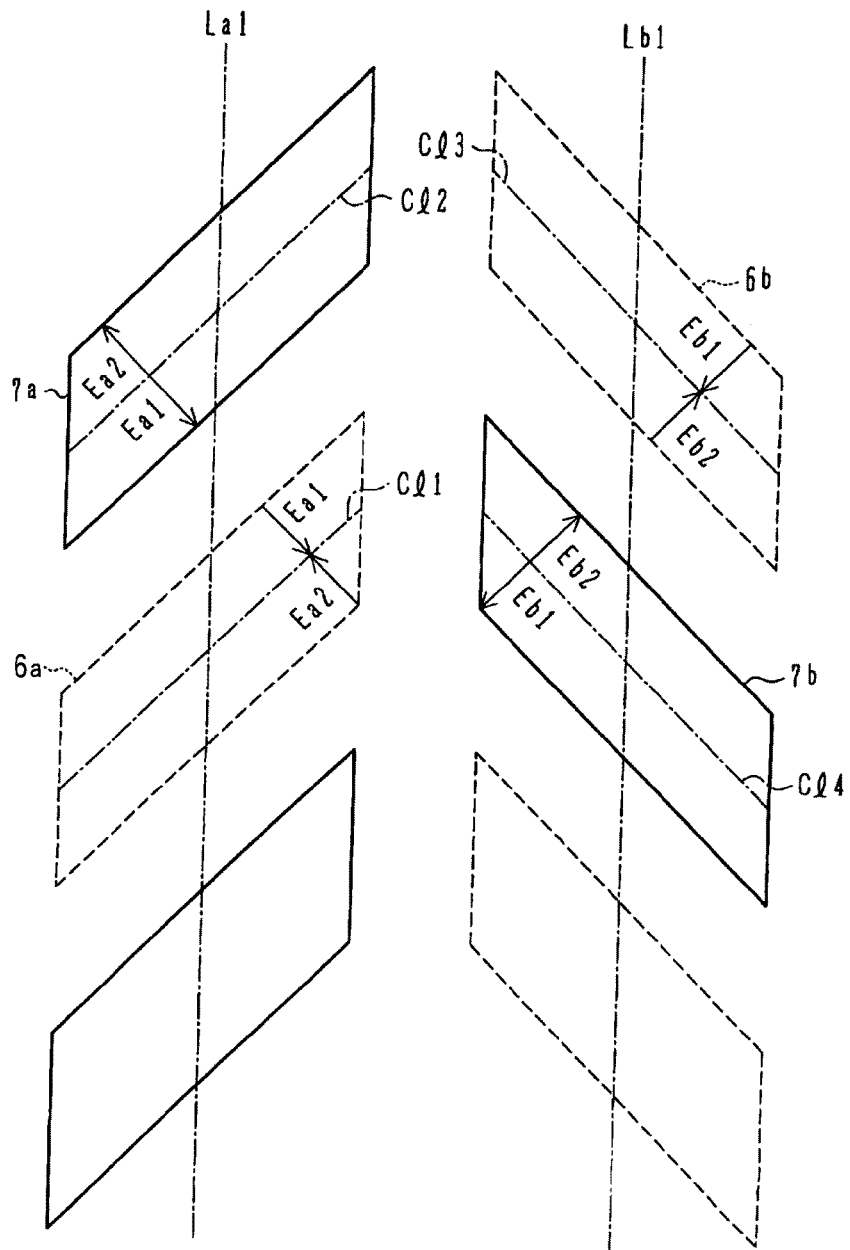
FIG. 5 is a schematic plan view showing vectors of oblique electric fields generated between transparent electrodes.

FIG. 5 is a schematic plan view showing vectors of oblique electric fields generated between the transparent electrodes. As shown, horizontal direction components (components parallel to the substrates 1 and 2) of the oblique electric fields Ea1 and Ea2 are perpendicular to the longitudinal direction of the slits 6a and 7a, whereas horizontal direction components of the oblique electric fields Eb1 and Eb2 are perpendicular to the longitudinal direction of the slits 6b and 7b.

Therefore, in the first (second) slit column La1 (Lb1), the fall directions of liquid crystal molecules are reversed in accordance with the horizontal direction components of the oblique electric fields Ea1 and Ea2 (Eb1 and Eb2), at the borders represented by the center lines Cl1 and CL2 (Cl3 and Cl4) along the width direction of the slits 6a and 7a (6b and 7b).

Further, since the slit longitudinal direction of the first slit column La1 is shifted by 90° from the slit longitudinal direction of the second slit column Lb1, a four-domain alignment structure is realized.

Comparative Example

As the comparative example for comparison with the first embodiment to be described later, a vertical alignment liquid crystal display device was manufactured having a different slit layout and similar other structures to those of the first embodiment. This comparative example will be described hereunder.

Figure 6:
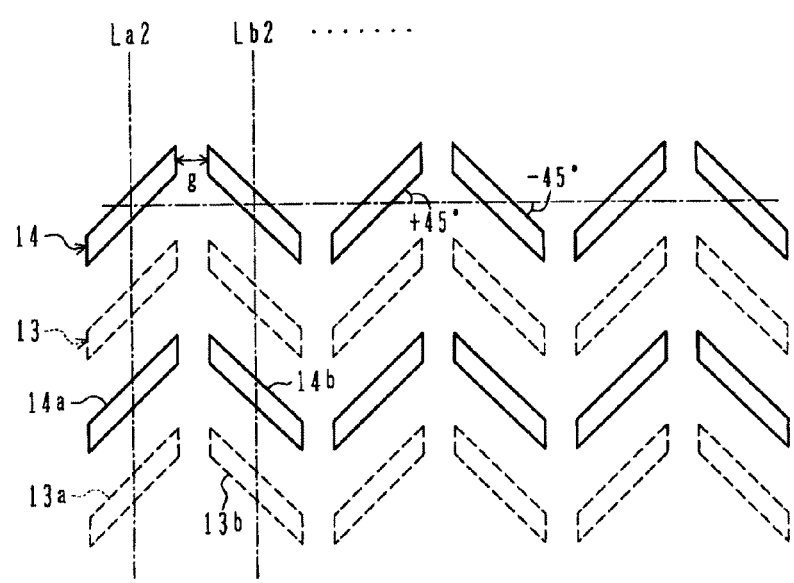
FIG. 6 is a plan view showing a slit layout of a comparative example.

FIG. 6 is a plan view showing a slit layout of the comparative example. As shown, slits 13 indicated by dotted lines and formed through a transparent back electrode and slits 14 indicated by solid lines and formed through a transparent front electrode are constituted of slits 13a and 14a of a first kind having an angle of +45° relative to the row direction, and slits 13b and 14b of a second kind having an angle of −45° relative to the row direction, respectively.

In the transparent back electrode, the slit 13a of the first kind and the slit 13b of the second kind are alternately disposed along the row direction shifted by half a pitch (slit period) of the row direction. Also in the transparent front electrode, the slit 14a of the first kind and the slit 14b of the second kind are alternately disposed along the row direction shifted by half a pitch of the row direction.

The slit 13a of the first kind through the transparent back electrode and the slit 14a of the first kind through the transparent front electrode are alternately disposed along the column direction shifted by half a pitch of the column direction to constitute a first slit column La2. The slit 13b of the second kind through the transparent back electrode and the slit 14b of the second kind through the transparent front electrode are alternately disposed along the column direction shifted by half a pitch of the column direction to constitute a second slit column Lb2.

The first slit column La2 and second slit column Lb2 are alternately disposed along the row direction, and in row direction, each position of slits of the first slit column La2 is the same as each position of slits of the second slit column Lb2.

Comparison Between First Embodiment and Comparative Example

Figure 7:
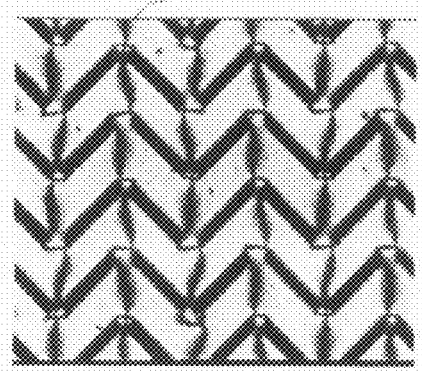
FIG. 7A is a photograph of a vertical alignment liquid crystal display having the slit layout of the first embodiment, taken with a polarization microscope while a voltage is applied.
FIG. 7B is a photograph of a vertical alignment liquid crystal display having the slit layout of the comparative example, taken with a polarization microscope while a voltage is applied.
Figure 7:
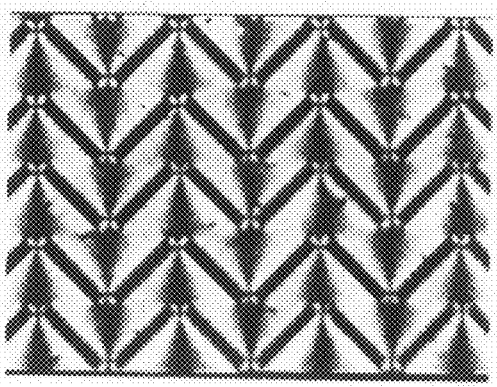

FIG. 7A is a photograph taken with a polarization microscope when a voltage is applied to the vertical alignment liquid crystal display device having the slit layout of the first embodiment, and FIG. 7B is a photograph taken with a polarization microscope when a voltage is applied to the vertical alignment liquid crystal display device having the slit layout of the comparative example.

A slit size of the liquid crystal display device of the comparative example has a longer side length of 100 μm and a shorter side length of 14 μm. A gap g (distance) as viewed in plan view between slits along the row direction is 20 μm.

As shown in FIGS. 7A and 7B, it can be seen that the photograph of the first embodiment taken with the polarization microscope has a smaller area of a dark portion S and brighter display, than the photograph of the comparative example taken with the polarization microscope.

Maximum transmissivities of the first embodiment and comparative example were measured in the following way. T1 represents a reference at a transmissivity of 100% when two polarizers of the liquid crystal display device are disposed in a parallel Nicol layout. T2 represents a maximum optical intensity of polarized light passed through the liquid crystal display device of the first embodiment or comparative example when a voltage is applied. A percentage (%) of T2/T1 was calculated. The optical intensity was calculated based on the electro-optical characteristics.

The maximum transmissivity of the comparative example was 23%, whereas that of the first embodiment was 34%. Improvement on the transmissivity by about 1.48 times was confirmed. The visual angle characteristics of the first embodiment was symmetrical and homogeneous in the up/down and right/left directions.

Since the slit layout of the first embodiment has a smaller squeezing region between the upper and lower transparent electrodes than that of the comparative example, it can be expected that a rise in electric resistance can be suppressed.

In this measurement, a center-of-gravity distance (distance between centers of gravity of adjacent slits as viewed on a display plane) between slits along the column direction was 60 μm. Maximum transmissivities were measured at a center-of-gravity distance of 120 μm. The maximum transmissivity of the comparative example was 29%, whereas that of the first embodiment was 41%. Improvement on the transmissivity by about 1.41 times was confirmed.

It was confirmed from measurements that there arose no problem about alignment stability, response time and the like of liquid crystal if the slit center-of-gravity distance along the column direction was shorter than about 120 μm. The slit center-of-gravity distance along the row direction is preferably five times or shorter than the slit center-of-gravity distance along the column direction.

If the slit size is too large, the pattern of four domains become visually recognizable. A length of the shorter side is preferably greater than a cell thickness. It is preferable that the slit size has a longer side length l1 of 20 μm to 500 μm and a shorter side length l2 of 4 μm to 30 μm. A two-dimensional gap g is preferably set to 20 μm or shorter.

Second Embodiment

Figure 8:
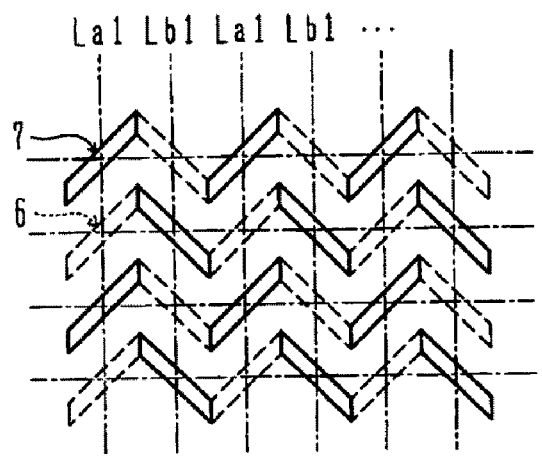
FIG. 8 is a plan view showing a slit layout according to a second embodiment.

FIG. 8 shows a slit layout of the second embodiment. The relation of the slit layout is similar to the first embodiment. A two-dimensional gap g along the row direction is eliminated, and slits are disposed so that the shorter side of each slit in a slit column La1 becomes as viewed in plan in contact with the shorter side of each slit in a slit column Lb1.

The above-described embodiments are applicable to a vertical alignment liquid crystal display device of a segment type or a type combining segments and dot matrices (the embodiments are applied to segments).

Although the shape of a slit is a parallelogram in the embodiments, the slit shape may be a rectangle. It is expected also in the latter case that good visual angle characteristics and high transmissivity can be obtained. In the latter case, patterning becomes easier than that for the parallelogram.

The present invention has been described in connection with the preferred embodiments. The invention is not limited only to the above embodiments.

For example, the direction of a slit may be reversed along the up/down direction.

It will be apparent to those skilled in the art that other various modifications, improvements, combinations, and the like can be made.

What are claimed are:

1. A liquid crystal display device comprising:
   a pair of opposing substrates;
   a vertical alignment liquid crystal layer sandwiched between said pair of substrates;
   a pair of transparent electrodes each formed on a surface of a respective one of said pair of substrates, on a side of said vertical alignment liquid crystal layer; and
   slits of a first kind and slits of a second kind formed in said pair of transparent electrodes, and disposed in a matrix shape, each of said slits having a rectangular shape or a parallelogram shape,
   wherein:
   each of said slits of the first kind have a first angle relative to a row direction of the matrix, and each of said slits of the second kind have a second angle different from the first angle relative to said row direction;
   in each of said pair of transparent electrodes, a first row consisting of slits of the first kind disposed at a constant pitch along said row direction, and a second row consisting of slits of the second kind disposed while being shifted by a half pitch of said constant pitch along said row direction, are alternately disposed along a column direction crossing said row direction; and as viewed in plan view, a first column of slits of the first kind is formed by alternately disposing slits of the first kind of one transparent electrode and slits of the first kind of the other transparent electrode, along said column direction, and a second column of slits of the second kind is formed by alternately disposing slits of the second kind of one transparent electrode and slits of the second kind of the other transparent electrode, said first column of slits of the first kind and said second column of slits of the second kind being disposed alternately along said row direction.

2. The liquid crystal display device according to claim 1, wherein:

the row direction and the column direction correspond to a right/left direction or an up/down direction of a visual field of a display area;

the angles of said slits of the first and second kinds relative to the row direction are about +45° and about −45°, respectively; and transmission axes of a first polarizer and a second polarizer disposed along said substrates are parallel to the row direction and the column direction, respectively.

3. The liquid crystal display device according to claim 2, wherein a length of a shorter side of one of said slits is greater than a cell thickness of a liquid crystal cell.

4. The liquid crystal display device according to claim 3, wherein a slit center-of-gravity distance between said slits along the column direction is 120 μm or shorter.

5. The liquid crystal display device according to claim 4, wherein a slit center-of-gravity distance between said slits along the row direction is less than or equal to five times the slit center-of-gravity distance between said slits along the column direction.

6. The liquid crystal display device according to claim 5, wherein the liquid crystal display device is of a segment type.

7. The liquid crystal display device according to claim 5, wherein the liquid crystal display device is of a type combining segments and dot matrices.

* * * * *